United States Patent
Hu

(10) Patent No.: US 7,364,171 B2
(45) Date of Patent: Apr. 29, 2008

(54) FRONT WHEEL ASSEMBLY FOR BABY STROLLERS

(76) Inventor: An-Min Hu, P.O. Box 44-2049, Taipei (TW) 10668

( * ) Notice: Subject to any disclaimer, the term of this patent is extended or adjusted under 35 U.S.C. 154(b) by 0 days.

(21) Appl. No.: 11/503,079

(22) Filed: Aug. 14, 2006

(65) Prior Publication Data

US 2008/0042383 A1    Feb. 21, 2008

(51) Int. Cl.
*B62B 7/00* (2006.01)
(52) U.S. Cl. .................... 280/47.38; 280/642; 280/647; 280/650; 280/658
(58) Field of Classification Search ............. 280/47.38, 280/642, 647, 650, 658; 301/111.01
See application file for complete search history.

(56) References Cited

U.S. PATENT DOCUMENTS

| | | | | |
|---|---|---|---|---|
| 4,229,039 A * | 10/1980 | Day | ............................ | 297/232 |
| 5,029,946 A * | 7/1991 | Liao | ....................... | 301/111.06 |
| 5,957,544 A * | 9/1999 | Hu | ........................ | 301/111.01 |
| 6,170,853 B1 * | 1/2001 | Brown et al. | ............... | 280/642 |
| 6,375,274 B1 * | 4/2002 | Morris | ................... | 301/111.01 |
| 6,520,598 B1 * | 2/2003 | Cheng | .................... | 301/111.01 |
| 6,584,641 B1 * | 7/2003 | Milbredt | ...................... | 16/35 R |
| 6,671,926 B2 * | 1/2004 | Huang | ........................ | 16/35 R |
| 2006/0103114 A1 * | 5/2006 | Huang | ........................ | 280/642 |
| 2006/0261565 A1 * | 11/2006 | Tan | ......................... | 280/47.38 |
| 2007/0013156 A1 * | 1/2007 | Wu et al. | ................ | 280/47.38 |
| 2007/0075525 A1 * | 4/2007 | Nolan et al. | ................ | 280/642 |
| 2007/0152416 A1 * | 7/2007 | Willis | ...................... | 280/47.38 |

\* cited by examiner

*Primary Examiner*—Christopher P. Ellis
*Assistant Examiner*—Katy Meyer

(57) ABSTRACT

A front wheel assembly for baby strollers includes a positioning member connected to a front frame of the stroller and a connection unit is inserted into the positioning member. A connection piece has two ends respectively inserted into the positioning member and a connection member to which the front wheels are connected. Two pins extend through two inclined guide slots in a button in the insertion of the connection unit and are engaged with an annular groove of the connection piece so as to connect the positioning member and the connection member. When the button is pushed downward, the two pins are guide to separated in opposite directions so that the connection member together with the connection piece can be removed from the positioning member.

6 Claims, 11 Drawing Sheets

FRONT WHEEL ASSEMBLY FOR BABY STROLLERS

BACKGROUND OF THE INVENTION (1) Field of the Invention

The present invention relates to a front wheel assembly for baby strollers wherein the front wheel assembly can be easily assembled and removed from the frame of the stroller.

(2) Description of the Prior Art

A conventional baby stroller 10 is shown in FIG. 1 and generally includes two front wheels 11 connected to the front frame 12 of the stroller 10 by a positioning member 13 which is connected to the front frame 12. The front wheels 11 are pivotably connected to the positioning member 13 and some brands provide their front wheels to be removed from the positioning member 13. However, some strollers have two front wheels, some has only one front wheels, and some are equipped with two pairs of front wheels on two sides. Each type of the front wheel(s) is connected to the positioning member 13 with a complicated connection structure which requires several steps to install the front wheel(s) to the positioning member 13. Some brands provide a mechanism which allows the front wheels to be removed from the positioning member 13, and this feature can only remove the front wheel(s) from the positioning member 13 which needs extra steps to be removed from the frame of the stroller 10.

The present invention intends to provide a front wheel assembly for baby strollers wherein the front wheel assembly is easily connected to the frame and can also be easily removed from the frame.

SUMMARY OF THE INVENTION

The present invention relates to a front wheel assembly for baby strollers and comprises a positioning member connected to a front frame of the stroller, and a connection unit is inserted into the positioning member and connected with a connection member to which front wheels are connected.

The primary object of the present invention is to provide a connection unit that controls the connection between the positioning member and the connection member so that the user can easily disengaged from the connection member with the front wheels from the positioning member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
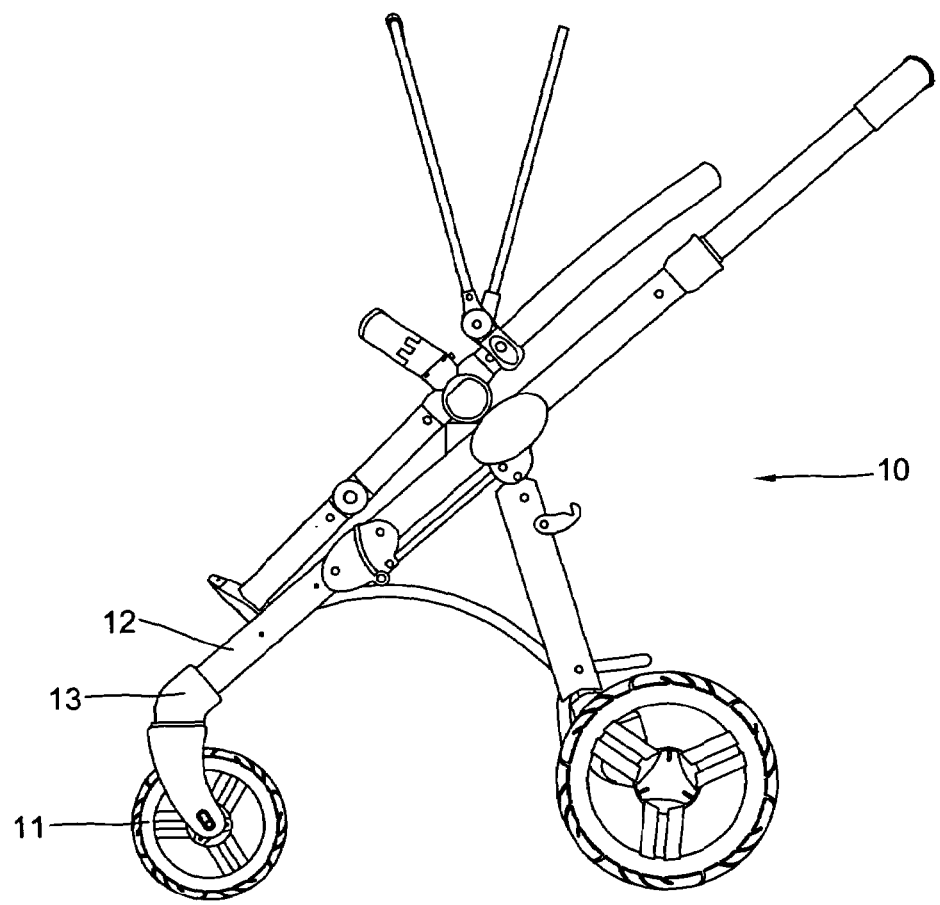
FIG. 1 is a side view of a conventional baby stroller.
Figure 2:
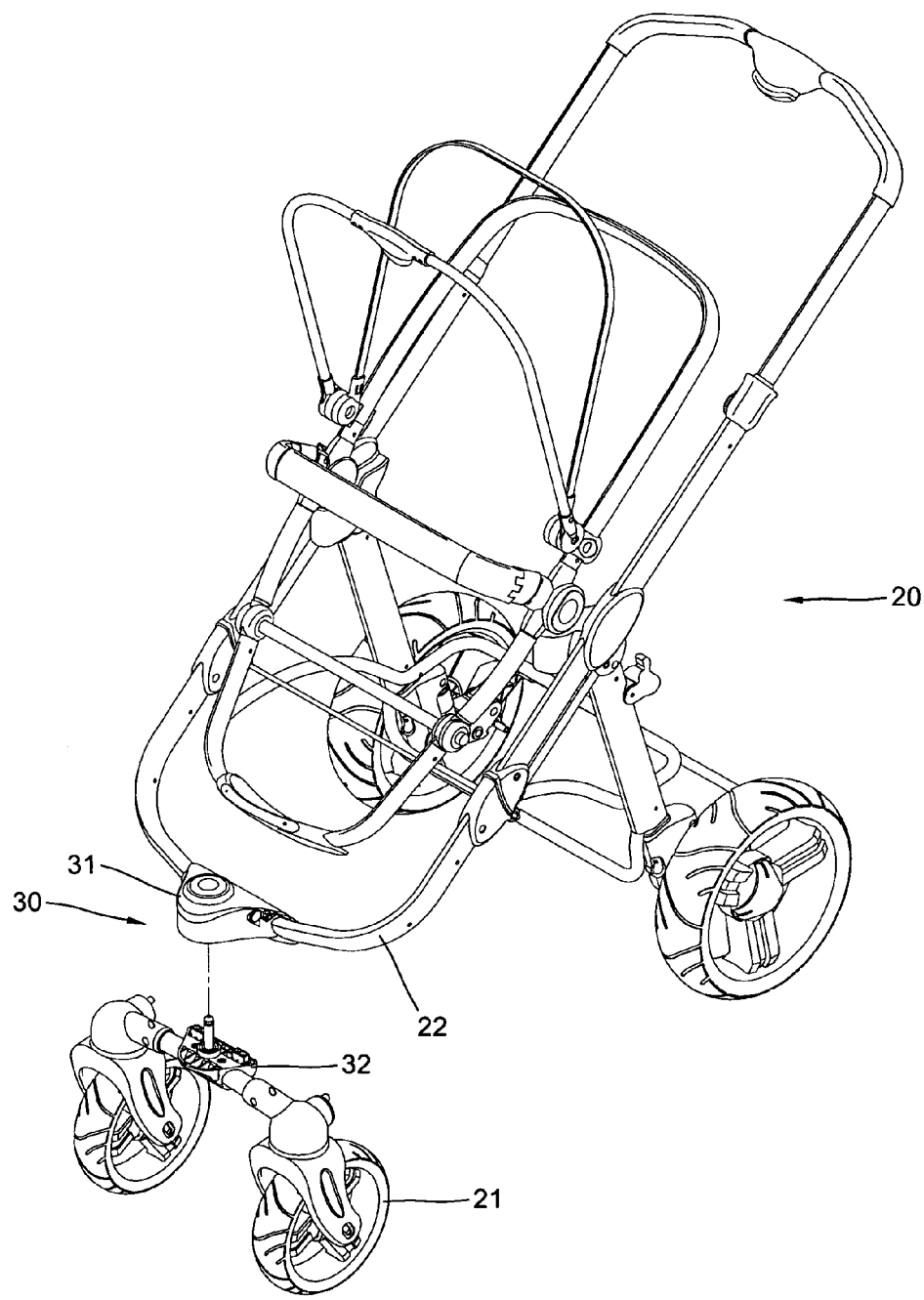
FIG. 2 is an exploded view to show the connection member with the front wheels and the positioning member of the present invention.
Figure 3:
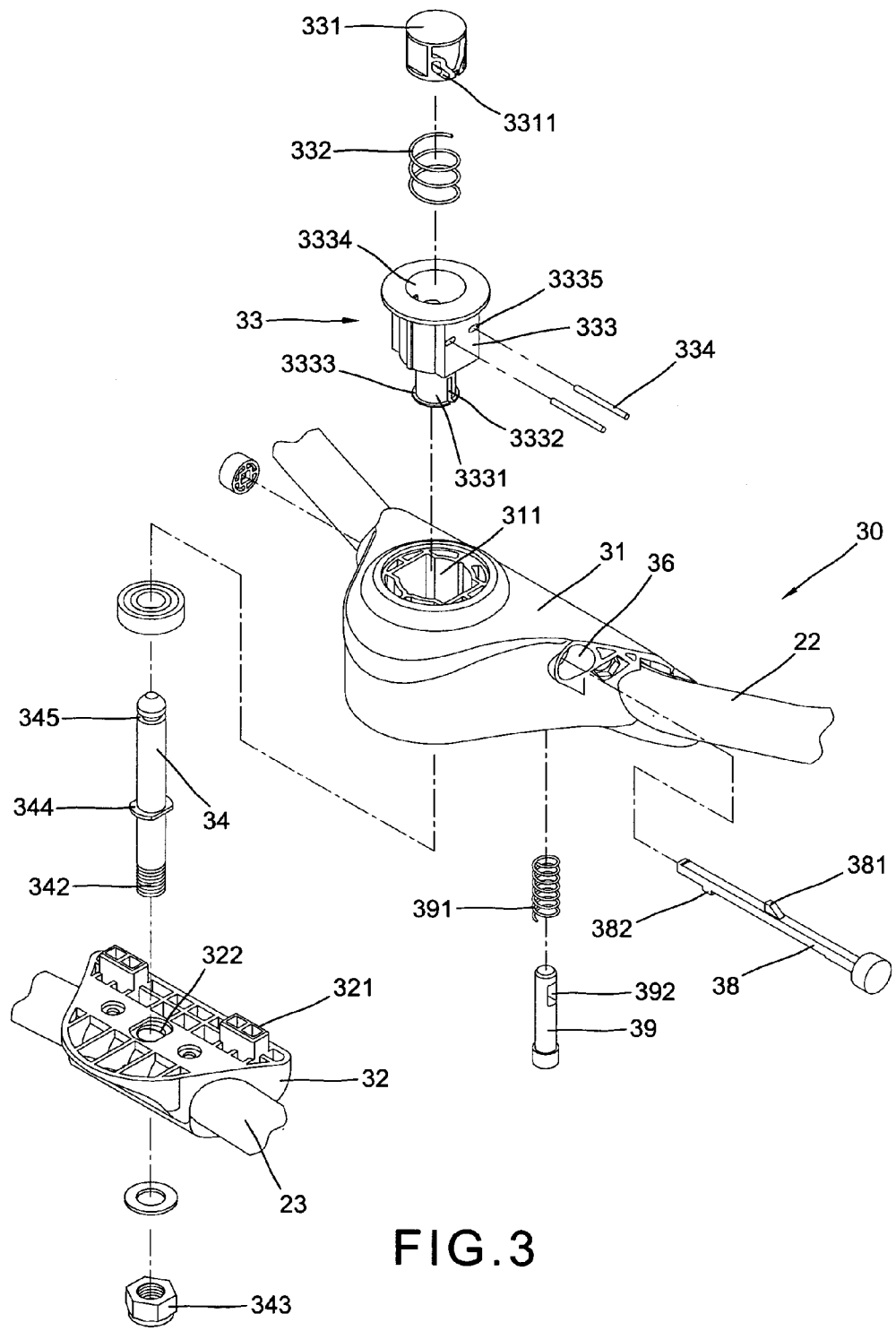
FIG. 3 is an exploded view to show the connection unit, the positioning member and the connection member of the present invention.
Figure 4:
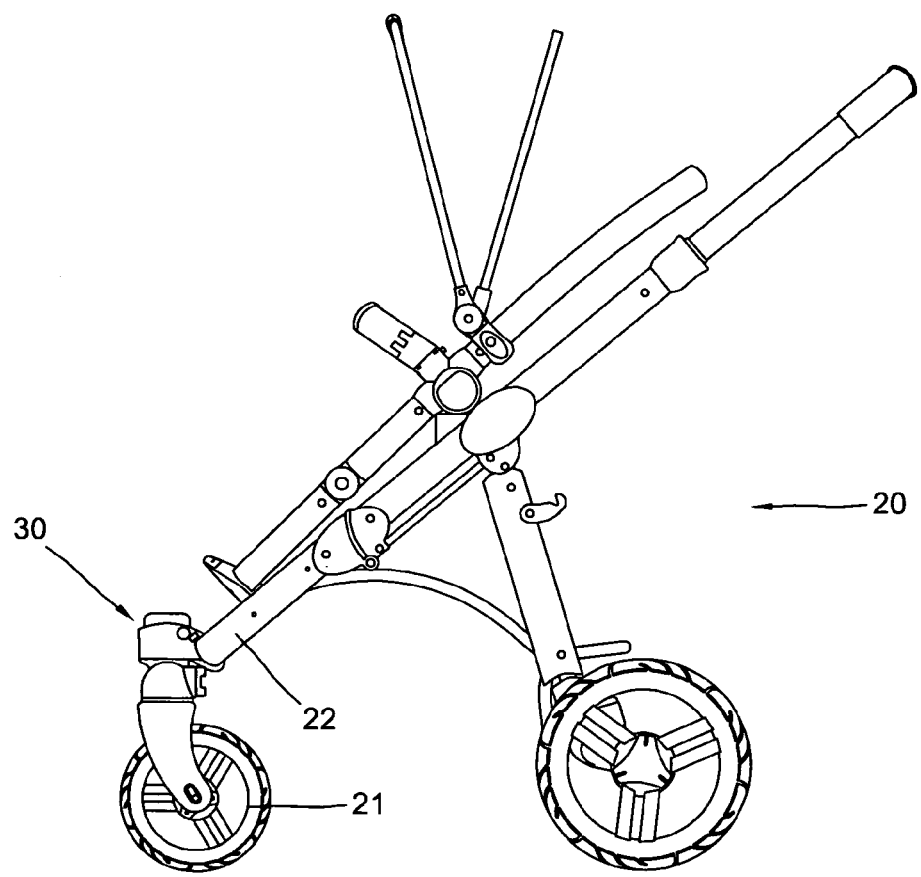
FIG. 4 is a side view to show the front wheel assembly of the present invention on a baby stroller.
Figure 5:
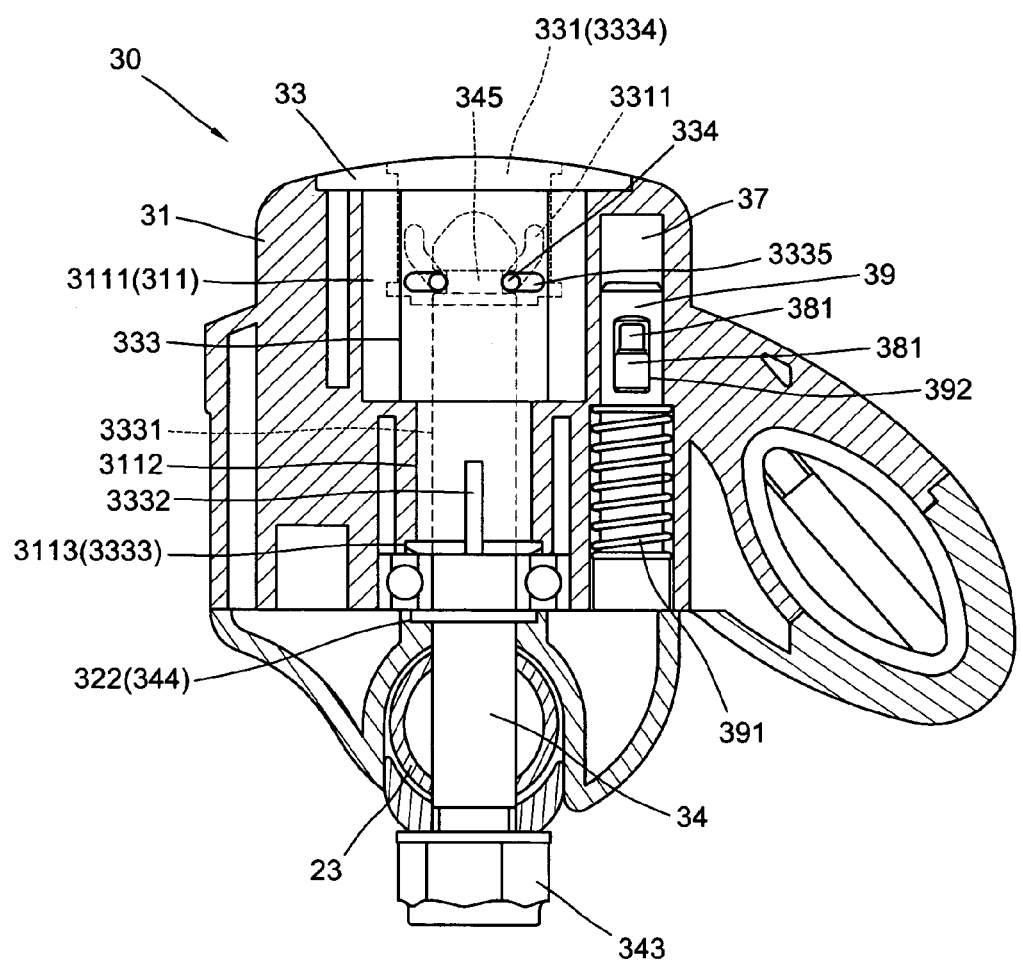
FIG. 5 is a cross sectional view to show the connection of the connection unit, the positioning member and the connection member of the present invention.
Figure 6:
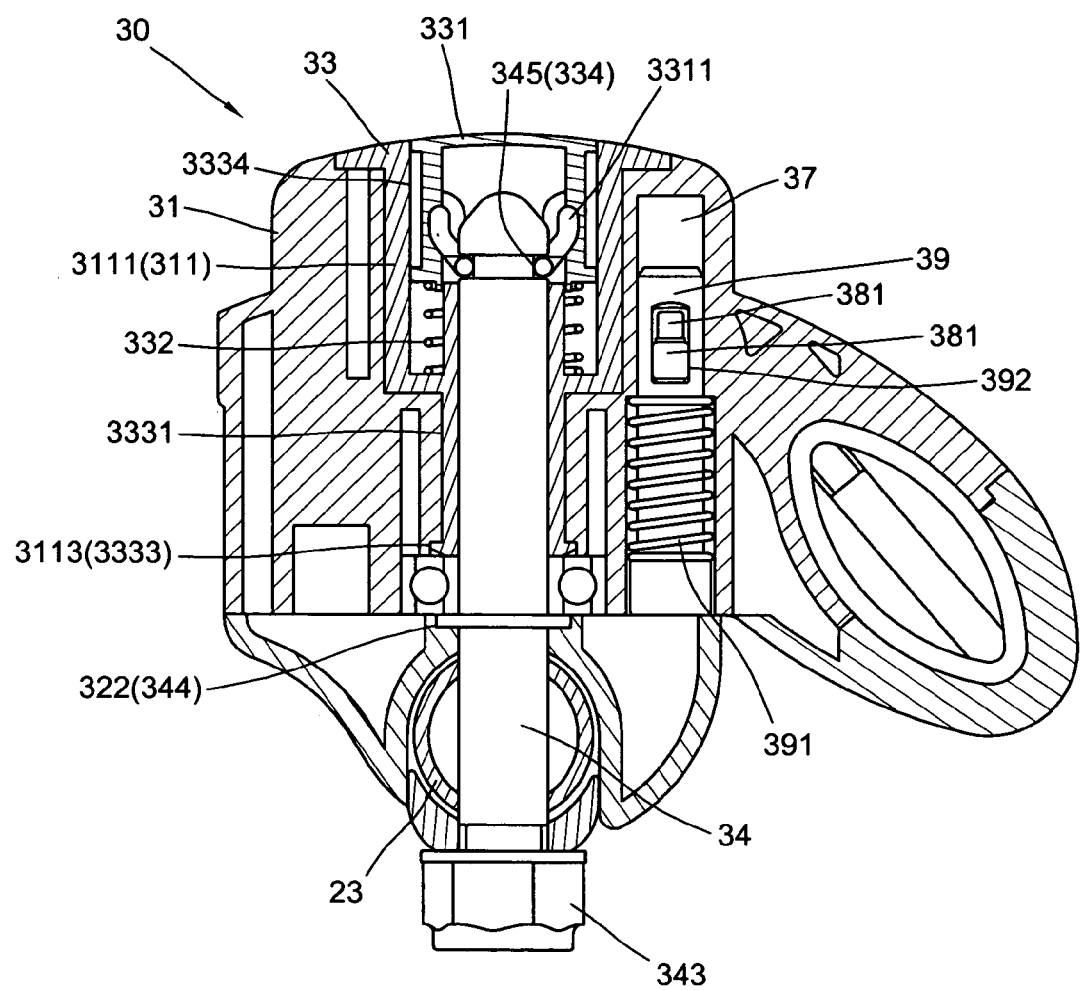
FIG. 6 is a cross sectional view to show that the two pins are engaged with the annular groove in the connection located piece between the positioning member and the connection member of the present invention.

Referring to FIGS. 2 to 6 and 8, the front wheel assembly 30 for a baby stroller 20 of the present invention comprises a positioning member 31 connected to a front frame 22 of the stroller 20 and a connection unit 33 is connected to the positioning member 31. A transverse bar 23 is connected to the connection member 32 to which front wheels 21 are connected. The positioning member 31 has a passage 311 defined therethrough so that the connection unit 33 is inserted into the passage 311. The connection unit 33 includes a button 331, a spring 332, an insertion 333 and two pins 334. The insertion 333 is received in the passage 311 of the positioning member 31 has a receiving hole 3334 for receiving the spring 332 and the button 331 therein. The passage 311 of the positioning member 31 includes an upper space 3111, a middle space 3112 and a low space 3113. Two guide slots 3311 are defined in the button 331 and two transverse holes 3335 are defined in a side of the insertion 333 so that two pins 334 extend through the transverse holes 3335 and inserted into the guide slots 3311.

The insertion 333 has an expandable portion 3331 which has an axial slit 3332 to define the expandable portion 3331 into two pieces and the two pieces can be expanded outward and inward because of the axial slit 3332. Each piece of the expandable portion 3331 has a flange 3333 extending from a distal end thereof. The insertion 333, the expandable portion 3331 and the flanges 3333 are respectively engaged with the upper space 3111, the middle space 3112 and the low space 3113.

The positioning member 31 has a horizontal passage 36 and a vertical passage 37. A first rod 38 is inserted into the horizontal passage 36 and includes a first block 381 and a second block 382 extending radially therefrom. A recess 361 with two inner ends 362 is defined in the horizontal passage 36 so that the second block 382 is axially movable in the recess 361 and stopped by the inner ends 362. A second rod 39 is inserted into the vertical passage 37 and a spring 391 is mounted to the second rod 39. A radial hole 392 is defined through the second rod 39 so that the first rod 38 extends through the radial hole 392. The first block 381 includes an inclined surface which pushes a periphery of the radial hole 392 to move the second rod 39 to compress the spring 391 when the first rod 38 is moved horizontally.

The connection member 32 includes two protrusions 321 extending from a top thereof and the positioning member 31 has two caves 35 defined in an underside thereof so that the protrusions 321 can be engaged with the caves 35. A connection piece 34 is connected between the positioning member 31 and the connection member 32 so combine the positioning member 31 and the connection member 32 together. The connection member 32 has a positioning hole 322 through which the connection piece 34 extends. The connection piece 34 has an annular groove 345 defined in an outer periphery of a first end thereof so that the two pins 334 are engaged with the annular groove 345, and the connection piece 34 has a threaded section 342 on a second end thereof which extends through the positioning hole 322 and a nut 343 is connected to the threaded section 342. The connection piece 34 has a positioning plate 344 extending radially outward from a middle portion thereof and the positioning plate 344 has two straight sides. The positioning hole 322 has two straight inner sides which are matched with the straight sides of the positioning plate 344 so that the connection piece 34 is not rotatable.

By the specific arrangement, the connection member 32 with the two front wheels 21 can be easily connected to the positioning member 31 on the front frame 22 of the stroller 20 by inserting the connection piece 34 on the connection member 32 into the passage 311 in the positioning member 31. The connection piece 34 is then positioned by the two pins 334.

Figure 7:
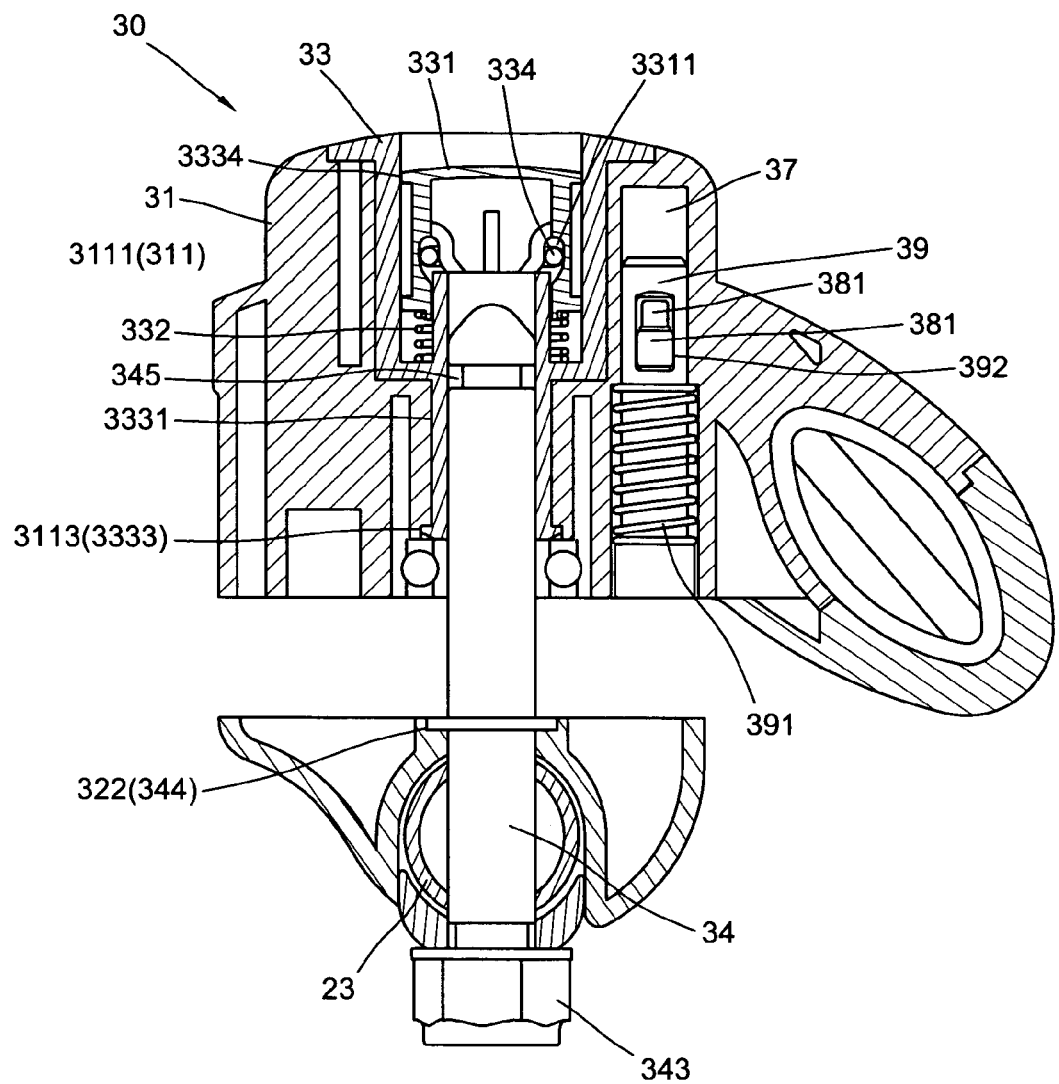
FIG. 7 shows that the two pins are separated apart when the button is pushed downward.
Figure 8:
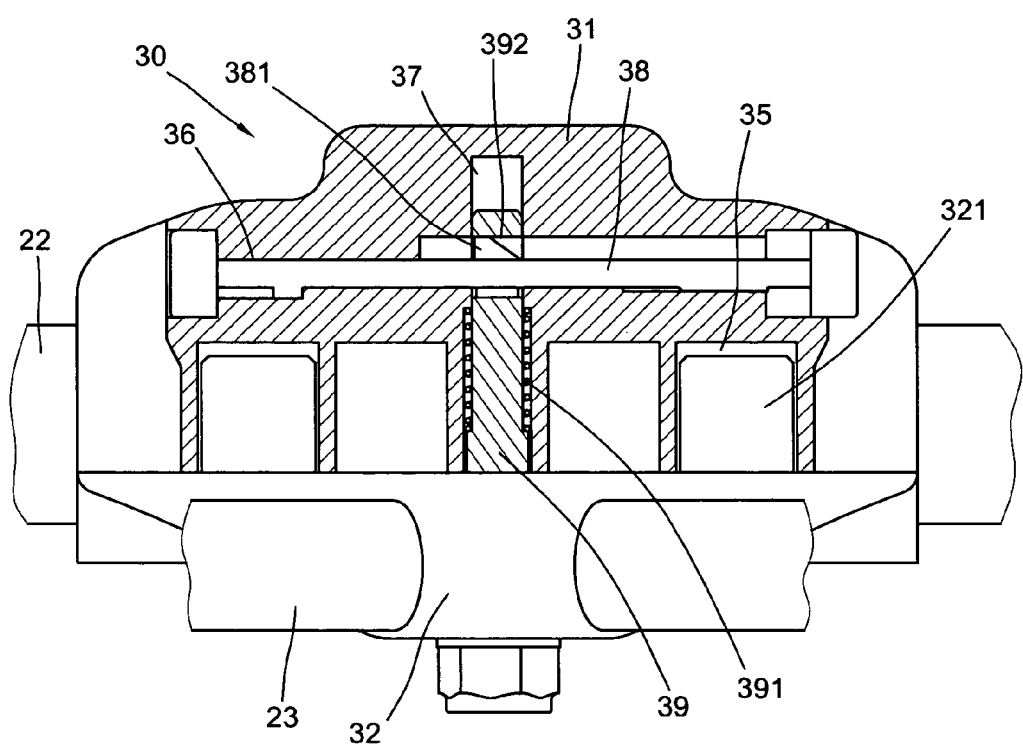
FIG. 8 shows that the protrusions on the connection members are engaged with the caves in the positioning member.

When pushing button 331 downward, as shown in FIG. 7, the two pins 334 are forced to move along the two inclined guide slots 3311 and are separated in two opposite directions in the two transverse holes 3335 so that the connection piece 34 is able to be removed from the passage 311 from the positioning member 31. The connection member 32 with the front wheels 21 are then easily separated from the positioning member 31.

Figure 9:
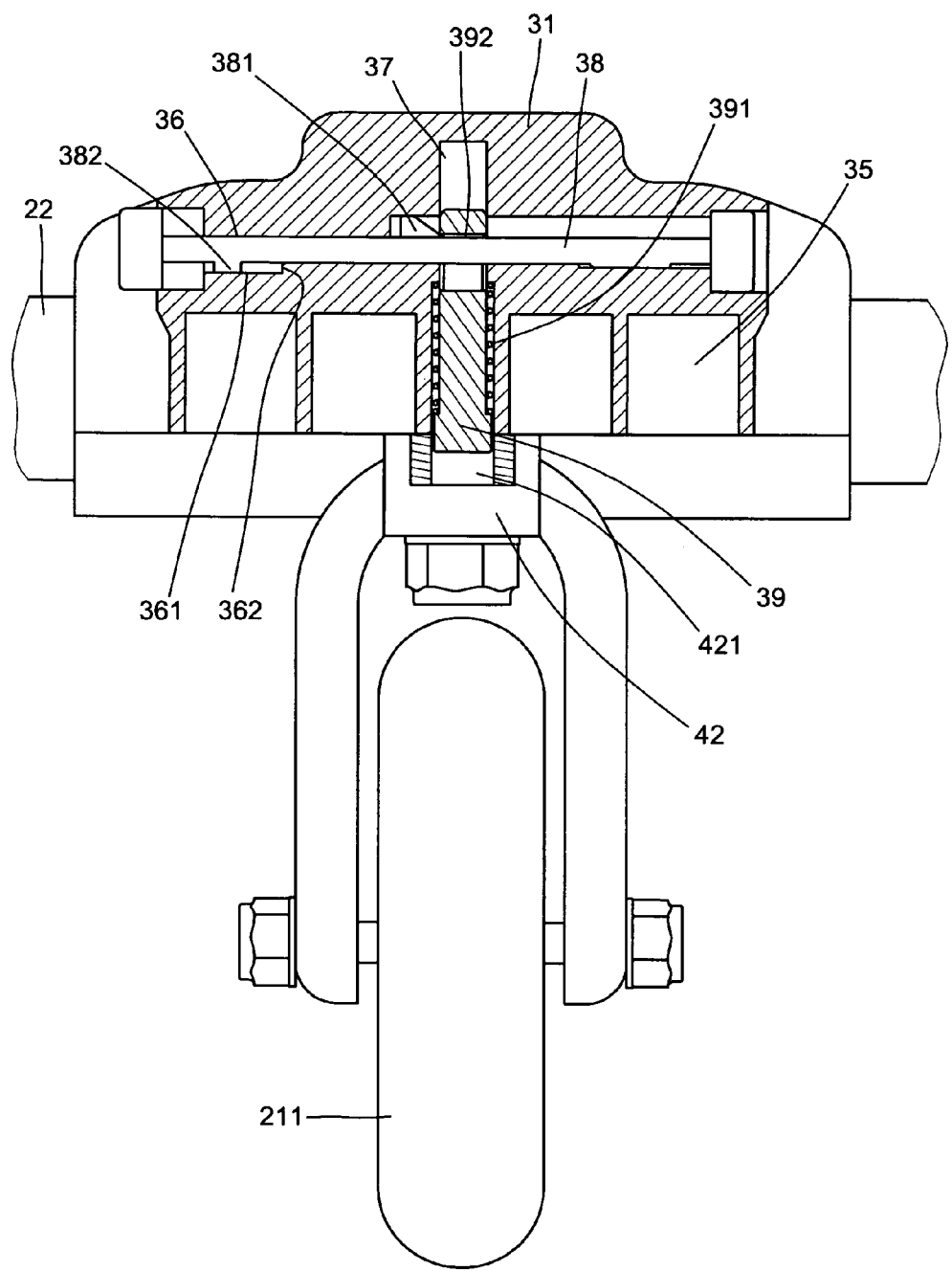
FIG. 9 shows the front wheel assembly includes a single front wheel.
Figure 10:
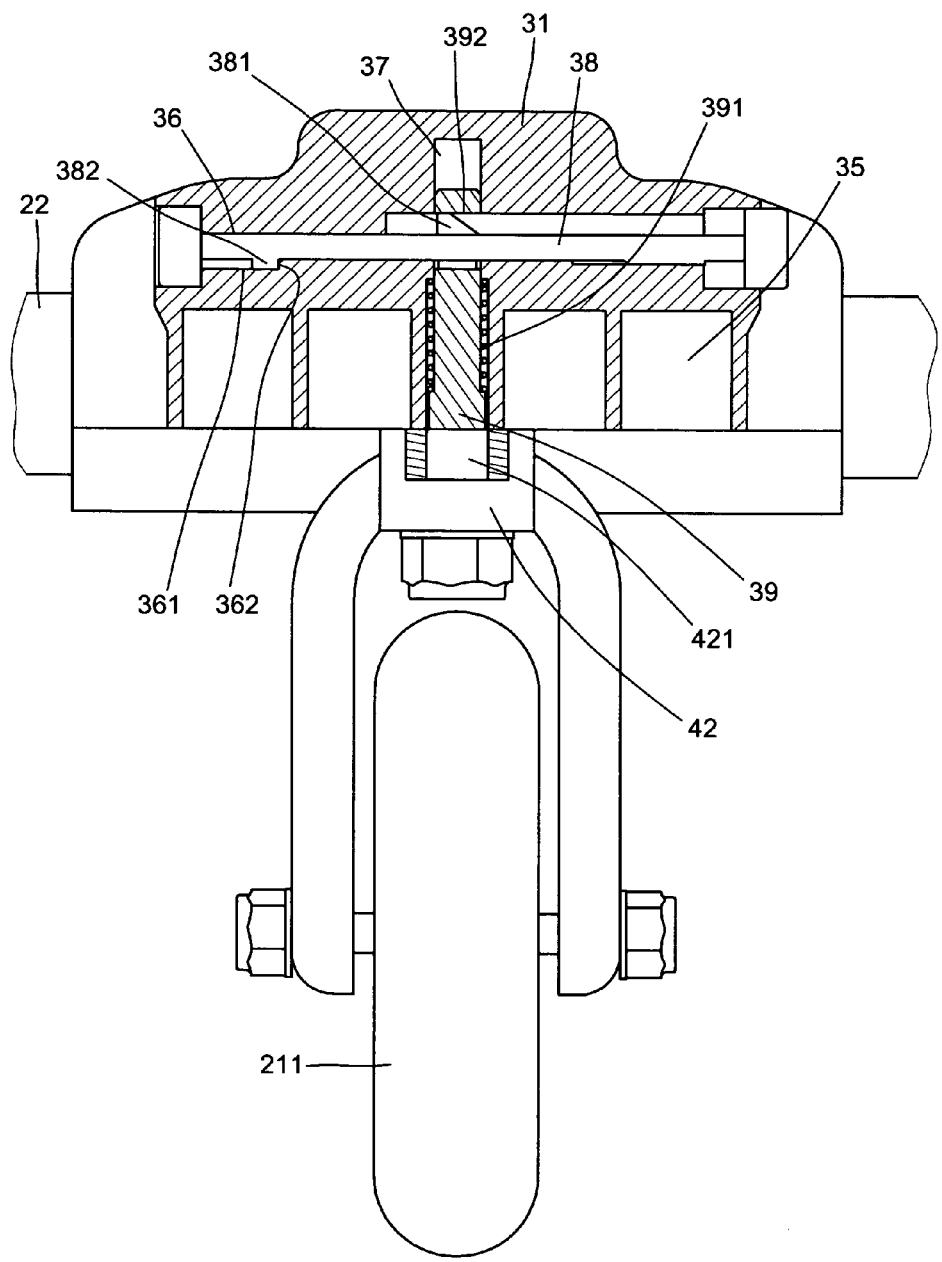
FIG. 10 shows that the second rod is lifted upward by pushing the first rod.
Figure 11:
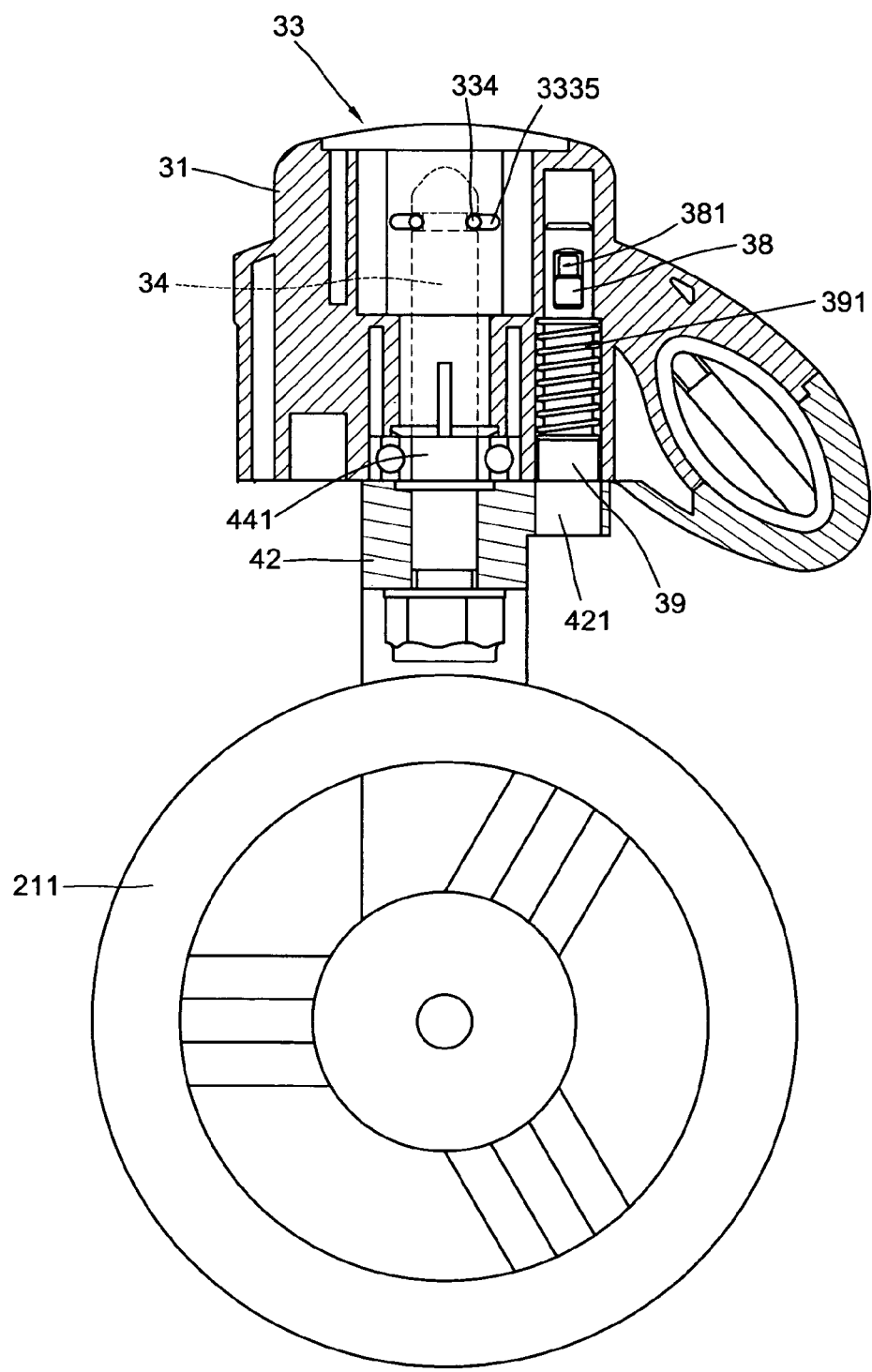
FIG. 11 shows another view of the status shown in FIG. 10.

FIGS. 9-11 show a second embodiment of the present invention, wherein the connection member 42 has a hole 421 which is located corresponding to the second rods 39 on the positioning member 31 so that the second rod 39 is inserted into the hole 421. A rod 441 extends form a top of the connection member 42 so as to be connected with the connection unit 33. The connection member 42 is connected to a single front wheel 211 of a pair of front wheels.

The operation processes are similar to the first embodiment, wherein the embodiment controls the connection member 42 to rotate or not to rotate. When the first rod 38 is pushed, the second rod 39 is lifted by the inclined surface of the first block 381 so that the second rod 39 is disengaged from the hole 421 of the connection member 42, and the connection member 42 is rotatable and the front wheel 211 can be rotated. When the connection member 42 is pivoted to its original position, the first rod 38 is pushed back, the second rod 39 is then pushed downward by the spring 391 and inserted into the hole 421 to lock the connection member 42.

While we have shown and described the embodiment in accordance with the present invention, it should be clear to those skilled in the art that further embodiments may be made without departing from the scope of the present invention.

What is claimed is:

1. A front wheel assembly for baby strollers, comprising:
a positioning member adapted to be connected to a front frame of the stroller, a connection unit inserted into the positioning member and connected with a connection member to which front wheels are connected, wherein the positioning member has a passage defined therethrough and the connection unit is inserted into the passage, the connection unit includes a button, a spring, an insertion and two pins, the insertion is received in the passage of the positioning member and the insertion has a receiving hole for receiving the spring and the button therein, the button has two inclined guide slots and the two pins extend into the guide slots, when the button is moved up and down, the two pins are moved in the inclined guide slots, wherein the connection member includes protrusions extending from a top thereof and the positioning member has caves defined in an underside thereof so that the protrusions are engaged with the caves, a connection piece is connected between the positioning member and the connection member.

2. The assembly as claimed in claim 1, wherein the insertion has an expandable portion which has an axial slit to define the expandable portion into two pieces, each piece of the expandable portion has a flange, the passage of the positioning member includes an upper space, a middle space and a low space, the insertion, the expandable portion and the flanges are respectively engaged with the upper space, the middle space and the low space.

3. The assembly as claimed in claim 1, wherein the connection piece has an annular groove defined in an outer periphery of a first end thereof so that the two pins are engaged with the annular groove.

4. The assembly as claimed in claim 3, wherein the connection piece has a threaded section on a second end thereof and a nut is connected to the threaded section.

5. The assembly as claimed in claim 1, wherein the connection piece has a positioning plate extending radially outward from a middle portion thereof and the connection member has a positioning hole through which the connection piece extends, the positioning plate has two straight sides and the positioning hole has two straight inner sides which are matched with the straight sides of the positioning plate so that the connection piece is not rotatable.

6. A front wheel assembly for baby strollers, comprising:
a positioning member adapted to be connected to a front frame of the stroller, a connection unit inserted into the positioning member and connected with a connection member to which front wheels are connected, wherein the positioning member has a horizontal passage and a vertical passage, a first rod is inserted into the horizontal passage and includes a first block and a second block extending radially therefrom, a recess with two inner ends is defined in the horizontal passage so that the second block is axially movable in the recess and stopped by the inner ends, a second rod is inserted into the vertical passage and a spring is mounted to the second rod, a radial hole is defined through the second rod so that the first rod extends through the radial hole, the first block includes an inclined surface which pushes a periphery of the radial hole to move the second rod to compress the spring when the first rod is moved horizontally.

* * * * *